United States Patent [19]

Grönert et al.

[11] Patent Number: 4,583,519
[45] Date of Patent: Apr. 22, 1986

[54] HEAT EXCHANGER

[75] Inventors: Heinz Grönert, Emmering; Manfred Eckert, Dachau; Johann Münich, Munich; Henning von Petersdorff, Puchheim; Manfred Mix, Munich; Wulf Radtke, Planegg, all of Fed. Rep. of Germany

[73] Assignee: M.A.N. Maschinenfabrik Augsburg-Nurnberg Aktiengesellschaft, Munich, Fed. Rep. of Germany

[21] Appl. No.: 582,335

[22] Filed: Feb. 22, 1984

[30] Foreign Application Priority Data

Feb. 26, 1983 [DE] Fed. Rep. of Germany ....... 3306800

[51] Int. Cl.$^4$ ................................................ F24J 2/46
[52] U.S. Cl. ............................ 126/418; 126/419/451; 165/183
[58] Field of Search ............... 126/417, 418, 419, 443, 126/442, 452; 138/38, 39, 30, 26; 165/183

[56] References Cited

U.S. PATENT DOCUMENTS 2,032,134  2/1936  Larkin ................................ 138/38

FOREIGN PATENT DOCUMENTS 2846178  4/1980  Fed. Rep. of Germany ...... 126/418
130953   8/1983  Japan ................................. 126/418

Primary Examiner—James C. Yeung
Attorney, Agent, or Firm—Scully, Scott, Murphy & Presser

[57] ABSTRACT

Heat exchangers which, through convection or radiation, are designed to absorb varyingly high energy flow about the circumference of their heat transmission walls. The cross-sectional area of the heat exchanger is subdivided into two or more flow passageways by means of inserts in such a manner, that the temperature differences and thermal stresses in the wall resulting from the high differing energy densities are reduced or even prevented. Achieved hereby is an extensively balanced temperature about the circumference of the heat exchanger wall so as to eliminate injurious thermal stresses.

6 Claims, 5 Drawing Figures

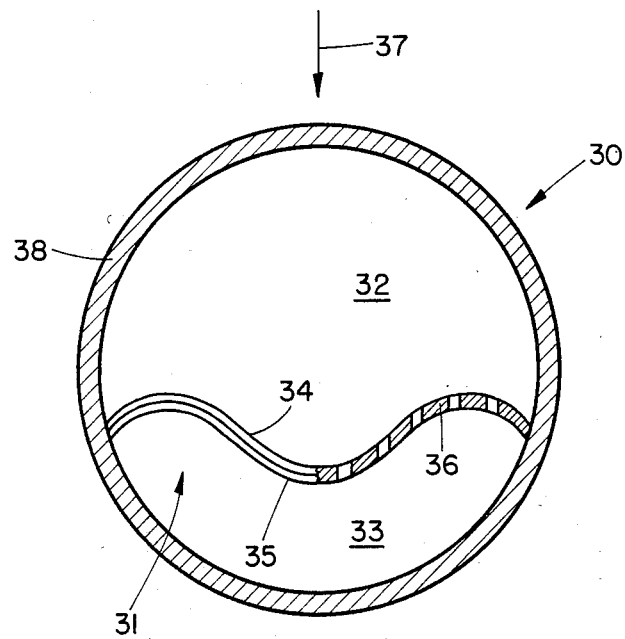
FIG.3
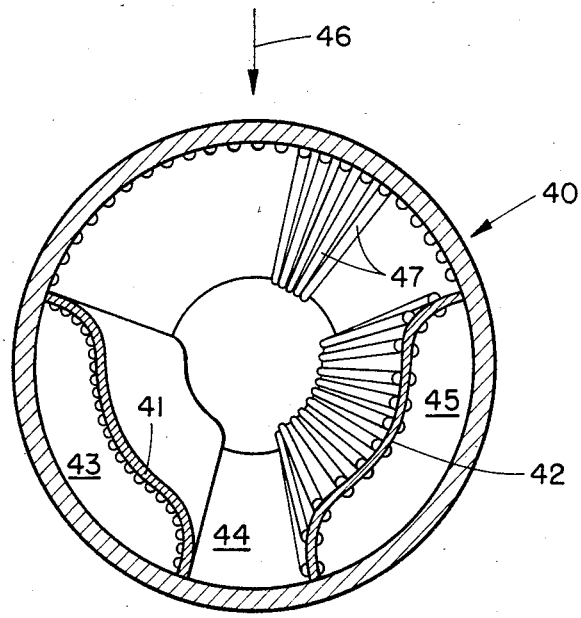
FIG.4
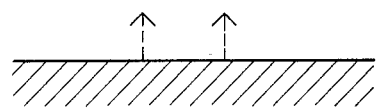

HEAT EXCHANGER

BACKGROUND OF THE INVENTION

1. Field of the Invention

The present invention relates to heat exchangers which, through convection or radiation, are designed to absorb varying amounts of energy at their heat transmission walls.

Heat exchangers of this type are presently employed, for instance, in radiation space heaters and with collectors for thermal solar energy use having line or spot focusing systems. Herein, under heat exchangers is to be understood, are hollow members of any desirable cross-sectional configuration which accommodate the flow of fluids, in which the cross-section can vary over the length of the heat exchanger.

The load capacity of heat exchangers, radiation absorbers, or other components which are exposed to high temperatures, is normally extensively curtailed when a non-uniform heat load is present, which leads to varying temperatures along the walls of the heat exchanger.

The permissible load on such components is then no longer primarily limited by the maximum temperature which can be taken by the materials over the coarse of time, but by the stresses which are generated by the temperature differences. In contrast with stresses which normally result from the actual operating load and which, as a rule, are invariable, the stresses induced by a non-uniform heat input can be reduced in many instances.

The heat exchanger surfaces facing towards the direct radiation are subjected to a clearly higher thermal load than is the rear wall of the heat exchanger. However, the actual load on the tube is thereby not to be viewed alone in the high wall temperatures of the tube side which is under direct radiation. They are, above all, the two minima between the sector under direction radiation and the sector under radiation from the reflection wall, and the resultant extensively varying temperature gradients over the circumference of the tube, which occasion the critical stresses.

2. Discussion of the Prior Art

When the temperatures along the circumference of a heat exchange tube rise and fall linearly between a minimum value and a maximum, then the thermally induced stresses on the tube can be largely eliminated through a suspension arrangement which is free from forces and moments, although this will not adequately solve the problem, especially in the area of minimum temperatures.

There are areas of applications such as solar tower power plants, in which the heat exchanger is exposed to a large number of thermal load changes, such as are encountered over the day-and-night cycle and from irregular clouding over of the sun. Obviously, these rising and falling cycles will develop stresses on the heat exchanger and restrict the performance of the materials thereof.

Besides the above-mentioned suspension of the heat exchanger, precurved constructions to reduce thermally induced stresses, and which can more effectively control the distortions.

As a rule, it is attempted to reduce thermal stresses resulting from thermal cycling by timed stretching of the heating and cooling phases, which often requires complex constructional measures for the holding of the temperatures.

A very effective measure for reducing the temperature differences between the radiation side and the rear side is the use of ceramic shields which, when arranged in front of the heat exchangers, will restrain a part of the direct radiation. This protective shield, however, is accompanied by relatively high temperatures of the shield, and with these high temperatures also radiates a correspondingly increased heat quantity from the absorber.

SUMMARY OF THE INVENTION

In accordance with present considerations, it is an object to balance temperature differences arising, for instance, over the circumference of heat exchanger tubes in the absorbers of solar tower power plants, not by passively covering the side exposed to radiation, but rather by means of a reduced dissipation of heat at the rear or cooler side of the exchanger tubes, and by an intensified transfer of heat from the hot, directly irradiated side of the tube to the heat carrier medium.

Accordingly, it is an object of the present invention to provide effective measures for the balancing of heat and thermal stress loads acting on heat exchangers of the above description which have low manufacturing demands and which do not have adverse consequences on the function or process of the heat exchangers.

It is a more specific object of the present invention to subdivide the cross-sectional area of the heat exchanger into two or more flow passageways by means of inserts in such a manner, that the temperature differences and thermal stresses in the wall resulting from the high differing energy densities are reduced or even prevented. Achieved hereby is an extensively balanced temperature about the circumference of the heat exchanger wall so as to eliminate damaging thermal stresses.

The mass flow of the thermal carrier medium must carry off the entire introduced heat. The shape and size of the individual cross-sections, and thereby that of the respective mass flows, must be so conformed to the incoming heat quantities that the tube walls will assume largely the same temperatures about the circumference. The small, or narrower passageways which are associated with the walls of the lower energy input side have, due to the cross-sectional area a low mass flow, and due to the greater flow resistance, a low velocity, and they therefore transfer less heat than the larger and faster mass flow through the large cross-section.

The balance of the different wall temperatures about the circumference of the tube is also enhanced when the inserts are formed as baffles the surfaces of which have different reflection and absorption capacities. The usual absorption values of the surfaces of NiCr-alloyed, highly heat-resistance materials are at 80% to 95% within the 750° to 900° C. temperature range. As a result of such operating conditions, considerable flows of heat can be transferred by radiation from the inner wall of the tube to the baffle. For the purpose of temperature balance, the rear wall, which is supplied with a low heat flow density, should radiate less heat against the baffle than the more forward tube wall, and this can be achieved, for example, by lower absorption values of the baffle surface facing the rear wall of the tube. Such a change in optical properties can be made on the baffle with relatively low manufacturing demands. Aluminizing of one side of the baffle with reflection values of 40% to 50%, or some other temperature-resistant coating with comparable optical values, are here mentioned by way of example. A variation in the absorption values, or the herein applicable emission values, on the rear side of the inner tube wall would provide similar effects, but would require a considerably greater investment.

Besides providing the above-described improved balancing of the temperatures over the circumference of the tube wall, the baffles also increase the surface involved in the heat transfer. This, on the one hand, lowers the maximum tube wall temperature and, on the other hand, raises the volume of heat which can be transferred to the heat carrier medium, which is an important consideration especially when it is intended to utilize the absorbed heat. At the same heat exchanger heat output, a shorter length of tube and a smaller overall size will be sufficient, or conversely, the heat output would be greater with the overall size remaining unchanged. Additionally, the lower peak temperatures increases the service life of the heat exchanger.

In order to further influence the heat transfer medium, the inserts and/or the heat exchanger tube can be profiled or equipped with longitudinally extending ribs. A further improvement in the discharge conduction of heat from the tube wall can be achieved by providing the inserts with ribs or corrugations extending almost transverse to the longitudinal direction of the tube, with the ribs or corrugation producing an additional turbulence of the heat transfer fluid.

Depending upon the design of a heat exchanger, radiation can be exchanged between the hot and cold walls of the heat exchanger. When this exchange is to be maintained, the inserts can take the shape of perforated plates or of wire mesh.

In order to automatically and optimally regulate the distribution of the heat transfer fluid to conform to changes in the radiation intensity, pursuant to a further aspect of the present invention, the insert or its support can be provided with adjusting mechanisms, such as bimetallic elements, which upon sensing wall temperature changes will change the position of the insert, and thereby the shape and size of the flow passageways so that the temperature differences will again reduce.

The inserts need not necessarily be installed so as to extend over the entire length of the tube; they can be readily installed in sections in regions of high heat flow densities.

Furthermore, the inserts and the shape of the flow passageways can be so designed that the additional flow resistance they offer to the medium is only minimal. This may be achieved, for instance, through plain, smooth surfaces, and by maintaining as small as possible the surfaces of the flow passageways which are contacted by the medium.

BRIEF DESCRIPTION OF THE DRAWINGS

Reference may now be had to the following detailed description of preferred embodiments of the invention, taken in conjunction with the accompanying drawings, in which:

FIGS. 3 to 5 illustrate cross-sectional views through heat exchanger tubes each having differently shaped inserts.

DETAILED DESCRIPTIONS OF THE DRAWINGS

Figure 1:
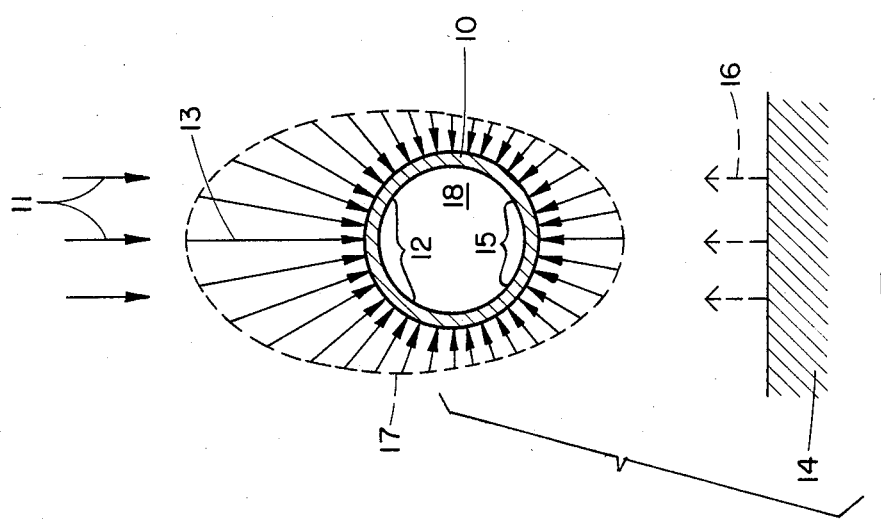
FIG. 1 illustrates a cross-section through a heat exchanger tube showing the distributed radiation.

FIG. 1 is a cross-sectional view through a heat exchanger tube 10 illustrating the distributed heat radiation. The direct radiation 11 reaches the upper region 12, with the length of the arrows 13 being shown as a measure of the radiation intensity.

When a reflecting wall 14 is arranged at the rear of the heat exchanger 10, then the rear side 15 of the heat exchanger 10 is subjected to the reflecting radiation 16. The two regions between regions 12 and 15 merely receive scattered radiation. In the case illustrated herein, the intensity distribution of the radiation impinging against the heat exchanger 10 can be roughly defined by the phantom line 17. Accordingly, the heat exchanger 10 is exposed to a temperature which varies about the circumference of the tube, and which is at a maximum in region 12 and at a minimum in the regions between region 12 and region 15.

Figure 2:
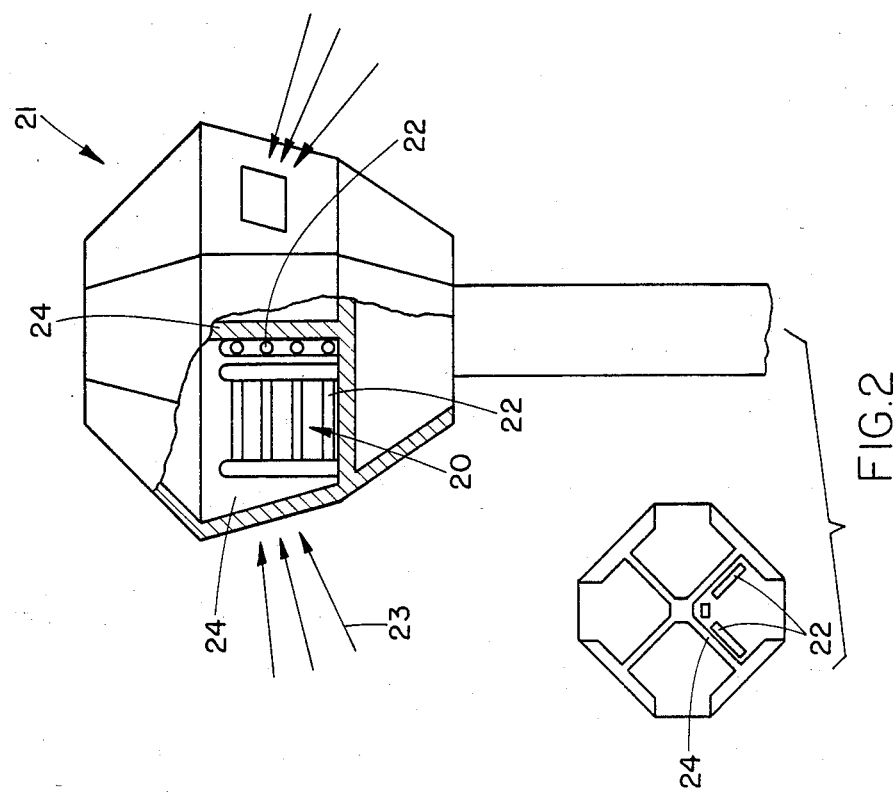
FIG. 2 illustrates a heat exchanger forming the absorber of a solar tower power plant.

FIG. 2 illustrates a heat exchanger 20 in the form of an absorber of a solar tower power station 21, which is composed of several heat exchanger tubes 22 connected in parallel. The tubes 22 which are exposed to the direct, concentrated sun rays 23 and to the radiation reflected from the rear wall 24, have the same radiation distribution as shown in FIG. 1.

Figure 5:
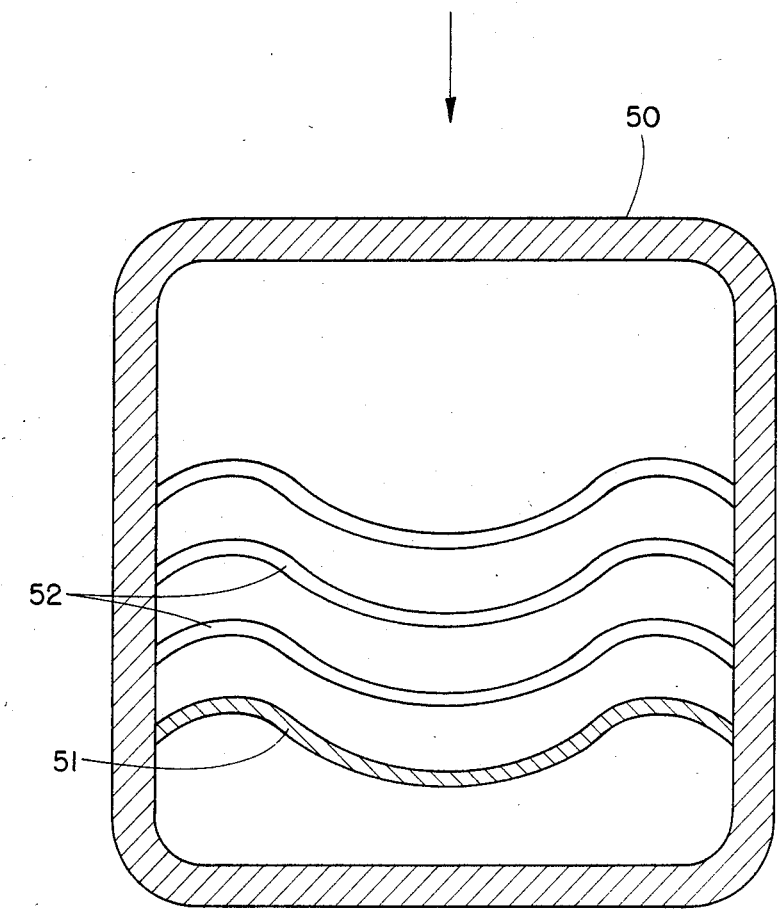

The heat exchanger tubes 22 have inserts installed so as to extend in their longitudinal direction; these are illustrated in FIGS. 3 to 5.

FIG. 3 illustrates a cylindrical heat exchanger 30, the interior of which is subdivided into two differently-sized passageways 32 and 33 by means of a specially contoured insert 31. On the left-hand side of FIG. 3, the two sides of the insert 31 are coated differently so that the layer 34 facing the hot zone possesses greater absorptivity for thermal radiation than does the layer 35 on the other side. In this manner, the higher radiation intensity and the greater absorptivity of the hotter zone allow more heat to be transferred to the carrier medium by means of the insert 31, 34, 35 to provide a further contribution towards a balanced temperature.

A similar temperature balancing effect by radiation between the outer walls can also be achieved by means of perforated plate 36, or a wire mesh as illustrated in the right-hand side of FIG. 3.

An insert, such as the insert 31 shown in FIG. 3, can also take the form of a bimetallic element which, when the temperature differential changes between the fluid flows in the two passageways 32 and 33 itself changes, will change position and thus vary the mass flow ratio in the two passageways 32 and 33.

FIG. 4 illustrates a heat exchanger 40 the interior of which is subdivided into three flow passageways 43, 44 and 45 by means of two inserts 41 and 42. The cross-sectional areas of the flow passageways 43, 44 and 45 are different.

In order to enhance the heat transfer, the heat exchanger tube 40 is equipped with longitudinally extending ribs 47 on the side receiving the direct radiation 46. The inserts 41 and 42 are also serve as heat transfer surfaces between the various passageways 43 to 45, and are provided with longitudinally extending ribs on either one side or on both sides thereof.

FIG. 5 illustrates a heat exchanger 50 having a rectangular cross-section, having an insert 51 installed at an angle relative to the longitudinal axis. In order to increase the extent of heat transfer through turbulence, the insert 51 is equipped with transverse ribs 52.

Depending upon the case of application, the flow duct is subdivided into two or more passageways, wherein the subdivision is effected over the entire length of the heat exchanger, or alternatively, only in certain sections. The inserts may be simple, relatively thin sheet metal elements which can be installed, or retrofitted into existing systems, in smooth bare or differently profiled tubes without normally requiring any design changes in the tubes. For the investment required, the desired results achieved through these baffles is considerable.

A temperature balance by means of inserts can be achieved for heat exchangers of any suitable shape and flow cross-section. Moreover, the applicability of heat exchangers which are equipped in this manner is not restricted to the exploitation of solar energy. Rather, such heat exchangers can find application wherever radiation energy is transmitted to a gaseous or liquid medium.

What is claimed is:

1. A heat exchange tube comprising:
    outside longitudinally extending heat transmissive walls forming a conduit for conducting a heat transfer fluid, the outside walls including at least first and second longitudinally extending wall portions, the first wall portion absorbing a first heat energy and the second wall portion absorbing a second heat energy; and
    insert means supported and longitudinally extending within the outside walls and dividing the conduit into at least first and second flow passageways;
    the first flow passageway being adjacent the first wall portion, and the second flow passageway being adjacent the second wall portion; and
    the ratio of the transversely extending cross-sectional areas of the first and second flow passageways being equal to the ratio of the heat energies absorbed by the first and second wall portions of the outside walls;
    wherein the heat energy absorbed by the heat transmissive walls varies over time, and the insert means includes a bimetallic element to change the shape of the insert means and the shape of the flow passageways in response to changes in the difference between the temperatures of the fluids in the first and second fluid passageways to maintain the the temperature of the heat transmissive walls uniform along transversely coplanar portions thereof.

2. A heat exchange tube according to claim 1 wherein the insert means comprise baffles.

3. A heat exchange tube according to claim 1 wherein the insert means includes first and second sides respectively facing toward the first and second flow passageways, and the two sides of the insert means have differing radiation energy absorption and reflection capacities.

4. A heat exchange tube according to claim 1 wherein the insert means comprise perforated plates or wire mesh.

5. A heat exchange tube according to claim 1 wherein the insert means and the shape of the flow passageways minimize any additional resistance to the flow of the heat transfer medium through the passageways.

6. A heat exchange tube comprising:
    outside longitudinally extending heat transmissive walls forming a conduit for conducting a heat transfer fluid; and
    insert means supported within and extending longitudinally within and transversely across the outside walls;
    the insert means dividing the conduit into at least first and second flow passageways;
    the first flow passageway being bounded by a first longitudinally extending portion of the outside walls, and the second flow passageway being bounded by a second longitudinally extending portion of the outside walls;
    the first wall portion absorbing a first heat energy and the second wall portion absorbing a second heat energy;
    the ratio of the transversely extending cross-sectional areas of the first and second fluid passageways being equal to the ratio of the heat energies absorbed by the first and second portions of the outside walls;
    wherein the heat energy absorbed by the heat transmissive walls varies over time, and the insert means includes a bimetallic element to change the shape of the insert means and the shape of the flow passageways in response to changes in the difference between the temperatures of the fluids in the first and second fluid passageways to maintain the temperature of the heat transmissive walls uniform along transversely coplanar portions thereof.

* * * * *